United States Patent [19]

Husman

[11] Patent Number: 5,199,614
[45] Date of Patent: Apr. 6, 1993

[54] GREASE GUN AUTO-PULL FOLLOWER APPARATUS

[75] Inventor: David N. Husman, Manchester, Mo.
[73] Assignee: Lincoln, St. Louis, Mo.
[21] Appl. No.: 742,367
[22] Filed: Aug. 8, 1991
[51] Int. Cl.[5] .......................... G01F 11/00; F16N 3/00
[52] U.S. Cl. ............................... 222/256; 222/340; 222/386; 242/107; 184/105.2
[58] Field of Search .................... 184/45.2, 105.2; 242/107; 222/256, 260, 326, 340, 386, 392

[56] References Cited

U.S. PATENT DOCUMENTS

| | | | |
|---|---|---|---|
| 1,676,358 | 7/1928 | Schott | 222/340 |
| 1,902,822 | 3/1933 | Becker | 222/256 X |
| 2,131,498 | 9/1938 | Chandler | 222/340 |
| 2,275,108 | 3/1942 | Levanas | 222/256 |
| 3,062,478 | 11/1962 | Adachi | 242/107 |
| 3,193,212 | 7/1965 | Lotta | 242/107 |
| 3,433,431 | 3/1969 | Holcomb | 242/107 |
| 3,827,650 | 8/1974 | Stevens et al. | 242/107 X |
| 5,044,471 | 9/1991 | Machek | 184/105.2 |

Primary Examiner—Andres Kashnikow
Assistant Examiner—A. Pomrening
Attorney, Agent, or Firm—Rogers, Howell & Haferkamp

[57] ABSTRACT

An auto-pull follower is provided for use in a grease gun of the type having a grease reservoir with a piston mounted for reciprocating movement in the reservoir. The reciprocating piston is provided with a novel auto-pull mechanism comprising a spring biased spool mounted for rotation on the piston, and a flexible cord or chain extending from the spool and out of the reservoir through a hole in a rearward end wall of the reservoir. Pulling the end of the cord outside the reservoir causes the spool to rotate against the bias of the spool spring and causes a length of cord to be unwound from the spool. After unwinding the length of cord from the spool, continued pulling of the cord from the reservoir end wall causes the piston to move against the bias of a piston spring in a direction towards the reservoir end wall. The movement of the piston toward the end wall increases the interior volume of the reservoir and enables the loading of grease into the reservoir interior. Releasing the cord causes the spring bias of the spool to automatically retract the length of cord pulled from the reservoir interior back into the reservoir interior and rewinds the length of the cord back on the spool.

20 Claims, 1 Drawing Sheet

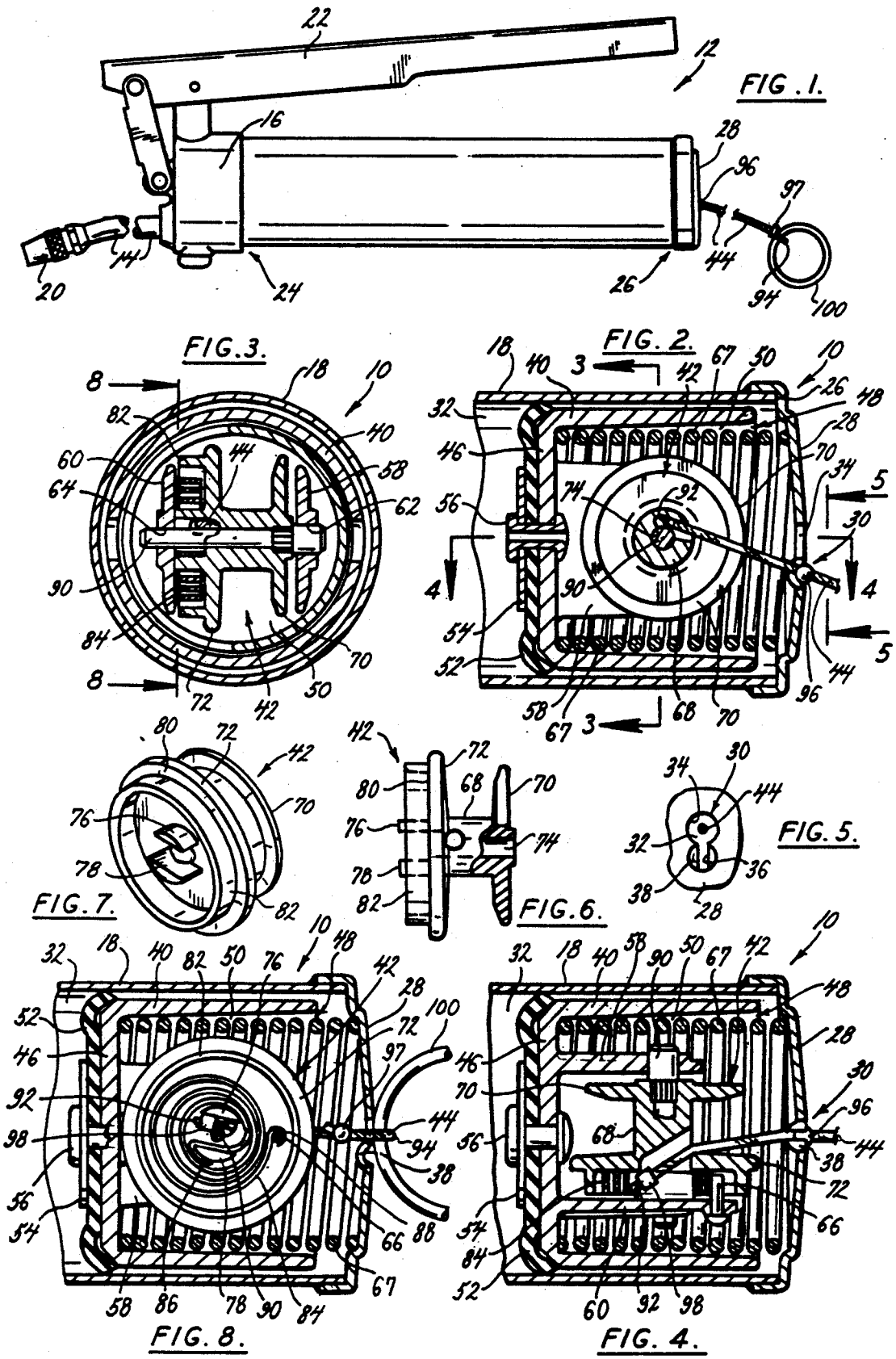

GREASE GUN AUTO-PULL FOLLOWER APPARATUS

BACKGROUND OF THE INVENTION

(1) Field of the Invention

The present invention pertains to an auto-pull follower apparatus used in a grease gun having a grease reservoir with a follower piston mounted for reciprocating movement therein, where the follower piston is moved in a first direction through the interior of the reservoir to enable loading grease into the reservoir interior or to increase the interior volume of the reservoir to permit insertion of a grease containing cartridge or collapsible container, and where the follower piston is moved by a piston spring in the opposite direction through the reservoir to move loaded grease from the reservoir interior or from a grease cartridge or container contained in the interior to a pump of the grease gun. The reciprocating piston is provided with a novel autopull mechanism comprising a spring biased spool mounted for rotation on the piston, and a flexible cord or chain extending from the spool and out of the reservoir through a hole in a rearward end wall of the reservoir. Pulling the end of the cord outside the reservoir causes the spool to rotate against the bias of the spool spring and a length of cord to be unwound from the spool, and then causes the piston to move against the bias of the piston spring in a direction towards the reservoir end wall. The movement of the piston toward the end wall increases the interior volume of the reservoir and enables the loading of grease into the reservoir interior. Releasing the cord causes the spring bias of the spool to automatically retract the length of cord pulled from the reservoir back into the reservoir interior and rewinds the length of cord back on the spool.

(2) Description of the Related Art

Manually operated high pressure grease guns commonly comprise a dispensing pipe, a pump housing, and a tubular grease supply reservoir removably attached to the pump housing. The dispensing pipe commonly has a nozzle fitting at one end for dispensing grease pumped from the gun. The opposite end of the pipe communicates with a manually operated pump contained in the pump housing. The pump is operated by a manual lever mechanism pivotally connected to the pump housing. Manipulating the lever mechanism dispenses grease contained in the supply reservoir of the gun through the dispensing pipe.

The tubular grease supply reservoir is removably attached to a threaded grease supply opening of the pump housing by a series of screw threads provided at an open end of the reservoir. A piston is mounted for reciprocating movement in the reservoir interior. The piston is biased by a piston spring toward the open end of the reservoir connected to the grease supply opening of the pump housing. Movement of the piston toward the reservoir open end by the piston spring moves grease from the reservoir interior to a pump intake and automatically decreases the volume of the reservoir interior as grease is dispensed from the gun.

To load the grease supply reservoir with grease, the operator of the gun first unscrews the tubular reservoir from the grease supply opening of the pump housing, and retracts the piston in the reservoir interior against the bias of the piston spring. The piston is typically retracted in the reservoir interior by a rod that is connected to a rearward face of the piston and extends out of a rear end wall of the tubular reservoir. The end of the rod extending outside the reservoir is pulled away from the reservoir end wall, causing a length of rod to be pulled from the reservoir interior through the reservoir end wall. Pulling the rod from the reservoir also causes the piston attached to the opposite end of the rod to slide toward the end wall in the reservoir interior against the bias of the piston spring. Grease in bulk is then packed in the open end of the tubular reservoir or an open ended grease cartridge is inserted into the reservoir interior. The operator then reassembles the reservoir to the pump housing by screwing the reservoir open end into the grease supply opening of the pump housing. The rod is then reinserted back into the reservoir. The rod is connected by a sliding connection to the piston so that as the rod is pushed back into the reservoir, the piston stays in substantially its retracted position and the rod is inserted into the grease in front of the piston. The grease gun is now ready for use.

Grease guns of the type described above are designed for use with grease packed in bulk in the reservoir interior or with open ended grease cartridges inserted into the reservoir interior. This is so because once the pull rod connected to the piston in the reservoir interior is retracted out the end wall of the reservoir to permit loading of grease or an open ended grease cartridge into the reservoir interior, the pull rod must then be reinserted back into the reservoir interior through the end wall. The grease contained in the reservoir interior or in the grease cartridge inserted in the interior enables the rod to pass through the grease as it is reinserted into the reservoir interior.

Grease guns of the type described above are not capable of using a collapsible grease container inserted into the reservoir interior because the collapsible container prevents the pull rod from being reinserted back into the reservoir interior after it has been pulled from the reservoir to reposition the spring biased piston at the rearward end of the reservoir. Attempting to reinsert the rod into the reservoir interior is prevented by the end of the rod inside the reservoir engaging against the collapsible container.

What is needed to overcome this disadvantage of known grease guns and to provide a high pressure grease gun that may be used with grease in bulk, grease contained in open ended cartridges, as well as grease contained in a collapsible container, is a spring biased piston in the reservoir interior that is retracted through the interior to permit the loading of grease therein, but does not require a pull rod that extends from the rearward end of the reservoir when the piston is retracted in the reservoir, and is reinserted into the reservoir interior after the interior has been loaded with grease.

The present invention overcomes the disadvantages associated with known grease guns set forth above by providing an auto-pull follower device having a flexible cord that is pulled from the rearward end of the grease supply reservoir to retract the spring biased piston in the reservoir for loading grease, and having a spring biased spool connected to the flexible cord that automatically retracts the length of cord pulled from the rearward end of the reservoir back into the reservoir interior and rewinds the length of cord on the spool.

SUMMARY OF THE INVENTION

In the preferred embodiment of the invention, the grease gun auto-pull follower apparatus of the present invention is described as being employed in a high pressure grease gun of the type comprising a manually operated pump housing and a tubular grease supply reservoir releasably attached to the pump housing. The pump housing contains a manually operated pump that is operated by a manual lever mechanism pivotally connected to the pump housing. Manipulating the lever mechanism dispenses grease contained in the tubular supply reservoir of the gun from the pump housing.

The tubular grease supply reservoir has an opening at one end and an end wall at its opposite end. The open end of the reservoir is removably attached to a threaded grease supply opening of the pump housing by a series of screw threads provided on the exterior of the reservoir adjacent its open end.

The grease gun auto-pull follower apparatus of the present invention is an improvement over the grease gun pull rod connected to the reciprocating piston of a high pressure grease gun. The auto-pull follower apparatus of the present invention is basically comprised of a follower piston, a spring biased spool mounted for rotation on the piston, and a length of flexible cord or chain having a first end secured to the spring biased spool and a second end extending through a hole in the rear end wall of the grease reservoir to the exterior of the reservoir.

The follower piston of the invention is a general cylindrical member that is inserted into the tubular interior of the grease gun grease supply reservoir. The periphery of the follower piston is dimensioned to fit inside the reservoir interior to permit reciprocating sliding movement of the piston through the interior volume of the reservoir. A coiled piston spring is positioned between the follower piston and the end wall of the reservoir. The piston spring resists movement of the follower piston toward the reservoir end wall. The piston is moved through the reservoir interior against the bias of the piston spring and toward the rear end wall of the reservoir to enable loading of grease into the reservoir interior. The piston spring forces the follower piston to slide in the opposite direction through the reservoir interior toward the open end of the reservoir to dispense loaded grease from the reservoir. A pair of spaced mounts are provided on a rearward face of the follower piston facing the end wall of the reservoir. The mounts have concentric holes provided therein and one of the two mounts has an anchor pin secured thereto.

The spool of the invention is formed with a center cylindrical barrel having a center bore hole extending axially therethrough, and circular flanges projecting radially outward from opposite ends of the center barrel. A projecting lug is formed on an end face of one of the circular flanges on an opposite side of the flange from its connection to the center barrel. A spiral spring is mounted on this same end face of the spool flange. Opposite ends of the spiral spring are provided at the interior and the exterior of the spiral, and the interior end of the spiral spool spring is secured to the lug on the spool flange.

The spool is mounted for rotation between the pair of mounts of the follower piston by an axle. The axle extends through the concentric holes of the piston mounts and through the center bore of the spool. The exterior end of the spool spring is attached to the anchor pin mounted on the one piston mount. The spiral spring connection between the follower piston mount and the spool flange biases the spool for rotation in a first direction relative to the follower piston. The mounts of the follower piston and the spool between the mounts all fit inside the coil spring biasing the follower piston through the reservoir interior toward the open end of the reservoir.

The follower cord has a predetermined length between its opposite first and second ends. The first end of the cord is secured to the spool and a portion of the cord at the first end is wound on the spool. Pulling the cord causes the spool to rotate in a second direction of rotation relative to the follower piston, and also increases the bias of the spiral spring that urges the spool to rotate in the first direction of rotation relative to the piston. The second end of the cord extends from the spool through the interior of the reservoir and the piston spring and out through a hole in the reservoir end wall. Pulling the second end of the cord through the end wall hole and out of the reservoir body interior causes the spool to unwind a portion of the length of the cord against the spool spring bias, and then causes the follower piston in the reservoir interior to move against the bias of the piston spring toward the end wall of the reservoir. Thus, pulling the second end of the cord through the end wall hole and away from the reservoir causes the follower piston to retract inside the reservoir interior, thereby enabling loading grease into the reservoir interior either in bulk, in an open ended grease cartridge, or in a collapsible container containing the grease. Once grease has been loaded in the reservoir interior, releasing the second end of the pull cord causes the follower piston to be moved by the force of the compressed piston spring toward the loaded grease to move grease from the interior, and then permits the spring biased spool mounted on the follower piston to automatically rewind the length of cord pulled from the spool and out through the reservoir end wall hole when the follower piston was originally retracted in the reservoir.

The reservoir end wall hole is formed with first and second adjoining sections. The first section is formed as a circular hole and the second section is formed as an oblong slot adjoining the hole. The pull cord is provided with a locking bead or ball formed on the pull cord. The size or dimension of the lock ball enables the ball to pass through the first section of the end wall hole, but is too large to pass through the second section of the end wall hole. When a length of the pull cord has been pulled through the end wall hole and out of the interior of the reservoir body, the length of cord can be locked outside the reservoir body by slipping the pull cord into the second section of the end wall hole. This will cause a portion of the pull cord to be pulled back into the reservoir interior due to the piston spring forcing the piston follower toward the open end of the reservoir and due to the spring bias of the spool, but will prevent the pull cord from being entirely retracted back into the reservoir body interior by the engagement of one of the locking ball formed on the pull cord against the reservoir end wall adjacent the second section of the end wall hole. To enable the remaining portion of the pull cord to be rewound on the spring biased spool, the pull cord must be repositioned in the first section of the end wall hole to permit the locking ball formed on the pull cord to pass through the first section of the hole.

BRIEF DESCRIPTION OF THE DRAWINGS

Further objects and features of the present invention are revealed in the following detailed description of the preferred embodiment of the invention and in the drawing figures wherein:

FIG. 1 is a side elevation view of a manually operated high pressure grease gun employing the auto-pull follower apparatus of the present invention;

FIG. 2 is a segmented side elevation view, in section, showing the auto-pull follower apparatus of the present invention assembled inside the interior of the grease gun of FIG. 1;

FIG. 3 is an elevation view, in section, along the line 3—3 of FIG. 2;

FIG. 4 is a segmented plan view, in section, taken along the line 4—4 of FIG. 2;

FIG. 5 is a segmented end view showing detail of the auto-pull follower apparatus of the present invention taken along the line 5—5 of FIG. 2;

FIG. 6 is a elevation view, partially in section, of the spool of the auto-pull follower apparatus of the present invention;

FIG. 7 is a perspective view of the spool of the auto-pull follower apparatus of the present invention; and FIG. 8 is a segmented side elevation view, in section, showing the auto-pull follower apparatus of the present invention taken along the line 8—8 of FIG. 3.

DESCRIPTION OF THE PREFERRED EMBODIMENT

In the preferred mode of the invention, the grease gun auto-pull follower apparatus 10 of the present invention is employed in a high pressure grease gun 12 of the type shown in FIG. 1 of the drawing figures. It should be understood that the description of the invention as used in the grease gun of FIG. 1 is illustrative of only the preferred embodiment of the invention. The grease gun auto-pull follower apparatus of the invention may be employed in other types of grease guns different from that shown in FIG. 1.

The manually operated high pressure grease gun 12 shown in FIG. 1 is comprised of a dispensing pipe 14, a pump housing 16, and a tubular grease supply reservoir 18 removably attached to the pump housing. The dispensing pipe 14 has a nozzle fitting 20 at its distal end for dispensing grease pumped from the gun. The opposite end of the pipe communicates with a manually operated pump (not shown) contained inside the pump housing 16. The pump is operated by a manual lever mechanism 22 pivotally connected to the pump housing 16. Manipulating the lever mechanism 22 dispenses grease contained in the supply reservoir 18 of the gun through the dispensing pipe 14.

The grease supply reservoir 18 is comprised of a hollow tubular body having opposite first and second ends 24, 26. The first end 24 of the reservoir is open and is removably attached to an internally threaded grease supply opening (not shown) of the pump housing 16 by a series of screw threads (not shown) formed on the exterior surface of the reservoir 18 adjacent its first end 24. The second end 26 of the tubular reservoir 18 is covered over by an end wall 28. The end wall 28 is shown in the drawing figures as being a separate component secured to the second end 26 of the tubular reservoir 18. The end wall 28 may also be formed integrally at the second end of the tubular reservoir 18 and may also be removably attached at the second end of the tubular reservoir by screw threads.

The end wall 28 is formed with an opening 30 providing access to the interior volume 32 of the reservoir 18. The detail of the end wall opening 30 is shown in FIG. 5. As seen in FIG. 5, the opening 30 is comprised of a first section 34 and a second section 36. The first section of the opening 34 is generally circular and the second section of the opening 36 is oblong and adjoins the first section of the opening. As seen in FIG. 5, the second section of the end wall opening 36 extends through a small concave depression 38 formed on the exterior surface of the end wall 28.

The auto-pull follower apparatus 10 of the present invention is generally comprised of a follower piston 40, a spring biased spool 42 mounted for rotation on the piston, and a length of flexible cord 44 secured at one end to the spool 42.

The follower piston 40 has a general tubular configuration having a piston head wall 46 at one end and on opening 48 at its opposite end. The opening 48 provides access to an interior volume 50 of the piston. The diameter of the cylindrical configuration of the piston is chosen to enable the piston to reciprocate through the interior 32 of the tubular reservoir 18. A resilient wiper 52 is secured to the forward face of the piston head wall 46 facing the open end 24 of the reservoir 18. The wiper 52 is secured to the head wall 46 by a washer 54 and a rivet 56. As seen in drawing FIGS. 2, 4 and 8, the wiper 52 has a diameter slightly larger than the diameter of the follower piston 40 and engages against the interior wall of the tubular reservoir 18. Dimensioning the wiper 52 slightly larger than the piston 40 enables the wiper to wipe grease packed in front of the follower piston 40, or to the left as viewed in the drawing figures, as the piston 40 is moved to the left forcing grease before it toward the pump housing 16. It is not necessary to provide a wiper on an embodiment of the auto pull follower that is to be used exclusively with a collapsible grease container.

A pair of spool mounts 58, 60 are formed integrally with and project rearward from the right side of the piston head wall 46 as viewed in the drawing figures. As seen in the drawing figures, the pair of spool mounts 58, 60 are spaced from each other and are provided with co-axial holes 62, 64 through the mounts. One of the mounts 60 is provided with an anchor pin 66 that is inserted through the mount and extends into the space between the pair of mounts 58, 60. A coiled spring 67 is positioned in the reservoir interior 32 between the follower piston 40 and the end wall 28 of the reservoir.

The spool 42 of the apparatus is formed with a center cylindrical barrel 68 and a pair of circular flanges 70, 72 at opposite ends of the center barrel 68. The flanges 70, 72 project outward radially from the center barrel. A center bore hole 74 extends axially through the center of the spool. A pair of lugs 76, 78 project from the outboard surface 80 of one of the spool end flanges 72. A circular rim 82 is formed extending from the same flange surface 80 surrounding the lugs. A spiral spring 84 is also mounted over the same outboard surface 80 of the spool flange 72. As is best seen in FIG. 8, opposite interior 86 and exterior 88 ends of the spiral spring 84 are connected to one of the spool lugs 76 and the anchor pin 66 of the follower piston spool mount 60 respectively.

The spool 42 is mounted for rotation between the pair of piston spool mounts 58, 60 by an axle 90. The axle 90 is inserted through the concentric holes 62, 64 of the respective piston mounts 58, 60 and through the center bore 74 of the spool 42. The spiral spring 84 connected between the anchor pin 66 mounted on the piston mount 60 and the lug 78 formed on the spool 42 biases the spool for rotation in a first direction relative to the follower piston 40. As viewed in FIG. 8 of the drawing figures, the spiral spring 84 biases the spool 42 to rotate in a counterclockwise direction relative to the follower piston 40.

The flexible cord 44 of the apparatus has a predetermined length between its opposite first and second ends 92, 94. The cord 44 is provided with a plurality of locking beads or balls and fittings secured on the pull cord and spacially arranged along the length of the cord. The size or diameter of the lock ball 96 is chosen to enable the ball to pass through the first section 32 of the reservoir end wall hole 30, but is too large to pass through the second section 36 of the end wall hole. The first end of the cord 92 is secured by a retaining fitting 98 to the spool barrel 68 and a portion of the cord at the first end is wound on the spool. The bias of the spool spiral spring 84 causes the spool to rotate in a counterclockwise direction and wind the cord 44 on the spool. The cord 44 extends from the spool 42 through the interior of the reservoir 18, the interior of the coiled piston spring 67 and out of the reservoir interior 32 through the reservoir end wall hole 30 to its second end 94. The second end 94 of the cord is secured to a manual pull ring 100 by a loop and a second fitting 97.

Pulling the pull ring 100 at the second end 94 of the cord 44 causes a portion of the cord adjacent the second end to be pulled through the end wall hole 30 and out of the reservoir body interior. This also causes the spool 42 to rotate in a clockwise direction as viewed in FIG. 8 against the bias of the spiral spring 84, and causes a portion of the length of the cord adjacent the first end 92 to unwind from the spool against the bias of the spiral spring 84. After the cord has been unwound from the spool barrel, continued pulling of the cord exerts a force on the barrel, causing the follower piston 40 in the reservoir interior to move against the bias of the coiled piston spring 67 toward the end wall 28 of the reservoir. Thus, pulling the second end of the cord 94 through the end wall hole 30 causes the follower piston 40 to retract inside the reservoir interior 32, thereby enabling loading grease into the reservoir interior either in bulk, in an open ended grease cartridge, or in a collapsible container containing grease.

To hold the piston 40 in its retracted position with the piston spring 67 compressed such as that shown in FIG. 4, the cord 44 is moved so that it extends through the second section 36 of the end wall hole 30. In this position of the cord, the bias of the compressed piston spring 67 urging the piston to the left as viewed in FIG. 4, pulls a portion of the cord length back into the reservoir interior 32 through the second section 36 of the end wall hole until the lock ball 96 secured to the cord seats in the concave depression 38 of the hole. With the lock ball 96 seated in the end wall hole depression 38, the piston 40 is secured in its retracted position shown in FIG. 4 enabling the loading of grease, a grease cartridge, or a grease container into the interior volume 32 of the reservoir.

Once grease is loaded into the interior of the reservoir 18, the piston 40 is released so that the bias of the compressed piston spring 67 forces the piston 40 to the left as viewed in FIG. 4. The piston 40 is released by disengaging the lock ball 96 from the depression 38 of the end wall hole 30 and passing the lock ball 96 through the first section 34 of the hole. The piston will move to the left as viewed in FIG. 4 under the force of the compressed piston spring 67 until a force it exerts on the grease, grease cartridge or grease container in the reservoir interior is counterbalanced by the force exerted by the piston spring. When the movement of the piston 40 to the left is stopped by the grease, grease cartridge or grease container, a portion of the cord length may still be extended outside of the reservoir 18. The bias of the spiral spring 84 will cause the spool 42 mounted on the piston 40 to rotate in the counterclockwise direction and rewind the length of cord 44 still extending outside the reservoir end wall 28 in through the end wall hole 30 and back onto the spool barrel 68. In this manner, the auto-pull follower apparatus 10 of the present invention enables the grease gun 12 to be used with either grease packed in bulk, grease contained in open ended cartridges, or grease contained in a collapsible container.

While the present invention has been described by reference to specific embodiments, it should be understood that modifications and variations of the invention may be constructed without departing from the scope of the invention defined in the following claims.

What is claimed is:

1. A fluid dispensing apparatus comprising:
   a pump housing having a fluid supply inlet and a fluid dispensing outlet;
   a fluid reservoir having a body with first and second ends, an opening at the first end of the body providing access to an interior of the body and an end wall at the second end of the body, the end wall having a hole therethrough, the first end of the body being attachable to the pump housing to communicate the interior of the body with the fluid supply inlet of the pump housing;
   follower means mounted in the interior of the body for reciprocating movement through the body between the first and second ends;
   pull means connected to the follower means and extending through the end wall hole out of the body interior for pulling the pull means through the end wall hole and out of the body interior and thereby causing the follower means to move through the body interior toward the second end; and,
   retracting means secured to the follower means and connected to the pull means for retracting the pull means pulled through the end wall hole out of the body interior back into the body interior.

2. The apparatus of claim 1, wherein:
   the pull means includes a flexible cord and the retracting means includes a spool mounted for rotation on the follower means, the cord being connected to the spool.

3. The apparatus of claim 2, wherein;
   pulling the cord through the end wall hole and out of the body interior causes the spool to rotate in a first direction, and rotation of the spool in a second direction opposite to the first direction causes the spool to wind the cord on the spool and retract the cord pulled through the end wall hole out of the body interior back into the body interior.

4. The apparatus of claim 3, wherein:
   a spring is connected between the follower means and the spool, the spring biases the spool to rotate in the second direction.

5. The apparatus of claim 4, wherein:
   rotation of the spool in the first direction is against the bias of the spring on the spool.

6. The apparatus of claim 1, wherein:

the follower means includes a piston mounted for reciprocating sliding movement through the interior of the body;

the retracting means includes a spool mounted for rotation on the piston; and, the pull means includes a flexible cord connected to the spool and extending through the end wall hole out of the body interior.

7. The apparatus of claim 6, wherein:

the cord is connected to the spool to cause the piston to slide through the body interior toward the second end of the body in response to the cord being pulled through the end wall hole and out of the body interior.

8. The apparatus of claim 7, wherein:

the cord is connected to the spool to cause the spool to rotate in a first direction relative to the piston as the cord is pulled through the end wall hole and out of the body interior.

9. The apparatus of claim 8, wherein:

a spring is connected between the piston and the spool, the spring biases the spool to rotate in a second direction relative to the piston, the rotation of the spool in the second direction causes the spool to wind the cord on the spool and causes the spool to retract the cord pulled through the end wall hole out of the body interior back into the body interior.

10. The apparatus of claim 9, wherein:

rotation of the spool in the first direction is against the bias of the spring on the spool, the spring biasing the spool to rotate in the second direction.

11. The apparatus of claim 6, wherein:

the hole in the end wall has a first section and a second section, the first section being larger than the second section; and the cord has at least one lock ball secured thereon, the lock ball being dimensioned to pass through the first section of the end wall hole but not pass through the second section of the end wall hole.

12. An auto-pull follower for use in a fluid dispensing device of a type employing a fluid reservoir having a tubular body with first and second ends, an opening at the first end of the body providing access to an interior of the body and an end wall at the second end of the body covering over the second end, the end wall having a hole therethrough, the auto-pull follower comprising:

follower means fit inside the interior of the tubular body for movement through the interior toward the second end of the body to load fluid in the body interior, and for movement through the interior toward the first end of the body to move loaded fluid from the body interior;

pull means connected to the follower means and extending out of the body interior through the end wall hole for having a length of the pull means pulled from the body interior through the end wall hole to move the follower means through the body interior toward the end wall; and, retracting means secured to the follower means and connected to the pull means for automatically retracting the length of the pull means pulled from the body interior through the end wall hole back into the body interior through the end wall hole.

13. The auto-pull follower of claim 12, wherein:

the retracting means includes a spool mounted for rotation on the follower means, and the pull means includes a flexible cord having first and second opposite end portions, the first end portion of the cord being secured to and partially wound on the spool.

14. The auto-pull follower of claim 13, wherein:

the follower means includes a piston mounted for reciprocating sliding movement through the interior of the body, the spool is mounted on the piston for rotation relative to the piston, and the second end portion of the cord extends from the spool through the end wall hole and out of the body interior.

15. The auto-pull follower of claim 14, wherein:

the first end portion of the cord secured to the spool causes the piston to slide through the body interior toward the end wall in response to the second end portion of the cord being pulled through the end wall hole and out of the body interior.

16. The auto-pull follower of claim 15, wherein:

the first end portion of the cord secured to the spool causes the spool to rotate in a first direction relative to the piston in response to the second end portion of the cord being pulled through the end wall hole and out of the body interior.

17. The auto-pull follower of claim 16, wherein:

a spring is connected between the piston and the spool, the spring biases the spool to rotate in a second direction opposite to the first direction relative to the piston, the rotation of the spool in the second direction causes the spool to wind the cord on the spool and causes the spool to retract the second end portion of the cord pulled through the end wall hole out of the body interior back into the body interior.

18. The auto-pull follower of claim 17, wherein:

rotation of the spool in the first direction relative to the piston is against the bias of the spring on the spool tending to rotate the spool in the second direction relative to the piston.

19. The auto-pull follower of claim 14, wherein:

the end wall hole has a first section and a second section, the first section being larger than the second section; and, the cord has at least one lock ball secured thereon, the lock ball is sized to pass through the first section of the end wall hole and to not pass through the second section of the end wall hole.

20. An auto-pull follower for use in a fluid dispensing device of a type employing a pump housing with a fluid supply inlet and a fluid dispensing outlet, and employing a fluid reservoir having a body with first and second ends, an opening at the first end of the body providing access to an interior of the body and an end wall at the second end of the body, the end wall having a hole therethrough, the first end of the body being attachable to the pump housing to communicate the interior of the body with the fluid supply inlet of the pump housing, the auto-pull follower comprising:

a follower fit inside the body interior for reciprocating movement in the interior between the first and second ends of the body, the follower moving in the interior toward the second end to enable loading fluid into the body interior, and the follower moving in the interior toward the first end to move loaded fluid from the first end of the body to the fluid inlet of the pump housing;

a pull cord having a predetermined length and opposite first and second end portions, the first end portion of the cord being secured to the follower, the cord extending from the first end portion out through the hole in the end wall to the second end portion of the cord outside the body interior; and, a spring biased spool mounted on the follower, the first end portion of the cord being secured to the spool and the spool automatically winding the cord on the spool to automatically retract a cord length pulled from the interior through the end wall hole back into the interior through the end wall hole.

* * * * *